(12) United States Patent
Chen et al.

(10) Patent No.: US 7,864,104 B2
(45) Date of Patent: Jan. 4, 2011

(54) DEVICE FOR DETERMINING AND MONITORING THE LEVEL OF A MEDIUM IN A CONTAINER

(75) Inventors: Qi Chen, Maulburg (DE); Klaus Feisst, Stegen (DE); Eric Bergmann, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 11/919,972

(22) PCT Filed: Apr. 27, 2006

(86) PCT No.: PCT/EP2006/061896
§ 371 (c)(1),
(2), (4) Date: Feb. 5, 2009

(87) PCT Pub. No.: WO2006/120124
PCT Pub. Date: Nov. 16, 2006

(65) Prior Publication Data
US 2009/0212996 A1 Aug. 27, 2009

(30) Foreign Application Priority Data
May 11, 2005 (DE) .................. 10 2005 022 493

(51) Int. Cl.
*G01S 13/08* (2006.01)
(52) U.S. Cl. .................. 342/124; 342/175
(58) Field of Classification Search ........... 342/124, 342/175, 198; 343/786; 333/13, 248
See application file for complete search history.

(56) References Cited

U.S. PATENT DOCUMENTS

| | | | | |
|---|---|---|---|---|
| 4,093,854 A | * | 6/1978 | Turcotte et al. | 376/118 |
| 4,287,496 A | * | 9/1981 | Young | 333/248 |
| 4,488,156 A | * | 12/1984 | DuFort et al. | 343/754 |
| 5,279,156 A | | 1/1994 | van der Pol | |
| 6,469,676 B1 | * | 10/2002 | Fehrenbach et al. | 343/786 |
| 6,661,389 B2 | * | 12/2003 | Griessbaum et al. | 343/786 |
| 6,859,187 B2 | * | 2/2005 | Ohlsson | 343/772 |
| 7,132,993 B2 | * | 11/2006 | Kuroda et al. | 343/786 |
| 7,640,799 B2 | * | 1/2010 | Griessbaum et al. | 73/290 V |
| 2002/0121138 A1 | * | 9/2002 | Malzahn | 73/290 R |
| 2002/0126061 A1 | * | 9/2002 | Griessbaum et al. | 343/786 |
| 2003/0151560 A1 | * | 8/2003 | Kienzle et al. | 343/786 |
| 2007/0200749 A1 | * | 8/2007 | McEwan | 342/124 |
| 2009/0212996 A1 | * | 8/2009 | Chen et al. | 342/124 |
| 2010/0090883 A1 | * | 4/2010 | Chen et al. | 342/124 |

FOREIGN PATENT DOCUMENTS

DE 93 12 251 U1 12/1993

(Continued)

*Primary Examiner*—John B Sotomayor
(74) *Attorney, Agent, or Firm*—Bacon & Thomas, PLLC

(57) ABSTRACT

The invention relates to an apparatus (1) for ascertaining and monitoring fill level (2) of a medium (3) in a container (4) by means of a travel-time measuring method of high-frequency measurement signals (6) with a horn antenna (7) having a waveguide section (8), a flared, horn section (9) and a cavity (11) filled, at least partially, with a dielectric filling body (12). Object of the invention is to provide a simple, temperature-stable, horn antenna filled with a dielectric material.

9 Claims, 4 Drawing Sheets

FOREIGN PATENT DOCUMENTS

| | | |
|---|---|---|
| DE | 100 40 943 A1 | 3/2002 |
| DE | 100 60 068 C1 | 6/2002 |
| EP | 0 943 902 A1 | 9/1999 |
| EP | 1 176 666 A2 | 1/2002 |
| WO | WO 86/05327 | 9/1986 |
| WO | WO 2004/079307 A1 | 9/2004 |
| WO | WO 2006/004510 A1 | 1/2006 |
| WO | WO 2009/115879 A1 | 9/2009 |

* cited by examiner

DEVICE FOR DETERMINING AND MONITORING THE LEVEL OF A MEDIUM IN A CONTAINER

TECHNICAL FIELD

The invention relates to an apparatus for ascertaining and monitoring the fill level of a medium in a container by means of a travel-time method utilizing high frequency measuring signals. The apparatus includes a horn antenna having a waveguide section and a flared horn section. The cavity of the sections is at least partially filled with a dielectric filling-body.

BACKGROUND DISCUSSION

Such horn antennas are found, for example, in microwave measuring devices of process and automation, measurements technology. These measuring devices are frequently used in automation and process control technology, in order to ascertain the process variable, fill level, in a container. Endress+Hauser, for instance, produces and distributes measuring devices under the mark Micro Pilot. These devices work according to the travel-time measuring method and serve for determining and/or monitoring a fill level of a medium in a container. In the travel-time measuring method, for example, high-frequency pulses, or radar wave pulses, are emitted via an antenna, and echo waves reflected on the surface of the medium are received back, following a distance-dependent travel time of the signal. From the time difference between emission of the high-frequency pulses and receipt of the reflected echo signal, the fill level can be ascertained. The so-called FMCW (Frequency Modulated Continuous Waves) method is likewise performable in this connection with the aforementioned principle of fill level measurement and the aforementioned apparatus.

Horn antennas filled with microwave-transmissive, dielectric material for improving the durability of the horn antenna against high-frequency technological, thermal and chemical influences of the medium are already known from a number of patent documents. However, in no case is any measure mentioned for counteracting the unavoidably high, thermal expansion of the filling-body, in order, in such way, to prevent the consequences resulting therefrom as regards sealing, mechanical stability and the HF-performance of the horn antenna filled with dielectric material.

DE 100 40 943 A1 discloses a horn antenna for fill-level measurement, wherein the horn antenna is at least partially filled with a dielectric material.

DE 100 57 441 A1 presents a horn antenna for a radar device, whose antenna cavity is at least partially filled with a filling and/or the filling embeds the entire horn antenna. Additionally, the filling is so embodied on the process-side that it forms a flange plating as sealing element.

WO 03/078936 A1 discloses sealing between the filling-body and the horn antenna by an additional sealing element, e.g. an O-ring, and the holding of the filling-body in the horn antenna by a holding element, e.g. a coupling nut, both of which are applied in the region of the radiation aperture, or largest opening, of the horn of the horn antenna.

As already mentioned above, in none of the mentioned documents is the problem of filling material expansion or a measure counteracting such discussed. Experience has shown that pressure-stable and chemically resistant, microwave-transmissive materials do have the problem that the material strongly expands as the temperature of the surroundings rises. This unavoidable, strong thermal expansion of the filling body, caused by the large coefficients of thermal expansion of these materials, produces in the filling-body material internal mechanical stresses, which can lead to a deformation of the filling body and even a bursting of the filling-body shape. Since the filling body is bounded on almost all sides by the metal horn-antenna, and the thermally expanding, dielectric material of the filling body can only expand in the radiation direction of the horn antenna, this leads to high mechanical stresses arise in the material and especially at edges. Under continued temperature alternation, for this reason, also fatigue phenomena, such as fatigue fractures, of the material of the filling body or bordering regions of material can be observed. According to the current state of the art, the assignee manufactures the filling body from different materials in different regions. These different materials all have coefficients of thermal expansion that differ from one another. On the process-side, the filling body is most often of a thin layer of a microwave-transmissive, chemically resistant material having a high coefficient of thermal expansion, to which is joined a filling body region with a material with a low thermal expansion, e.g. Rohacell, with hollow glass spheres or with other temperature compensating fillers. The materials, whose thermal expansions are compensated by introduction of various material components and material properties, have the disadvantage that they are very expensive and, additionally, at the interfaces of the materials, a portion of the transmitted microwaves is reflected back and attenuated. Disadvantageous in the case of such multi-region filling bodies of different materials are also the complex manufacture, due to the different manufacturing processes of the separate filling body regions, and the high manufacturing costs associated therewith.

SUMMARY OF THE INVENTION

An object of the invention is to provide a simple, temperature-stable, horn antenna filled with a dielectric material.

This object is achieved, according to an embodiment of the invention, by forming in the flared horn section between an inner surface of the horn antenna and the outer surface of the dielectric filling body a defined separation. This separation between the outer surface of the filling body and the inner surface of the horn antenna compensates the variable thermal expansion of the dielectric material of the filling body and the internal mechanical stresses in the material, since this separation changes, due to the thermal expansion of the filling body, as a function of the surrounding temperature. At a maximum temperature predetermined for this antenna version, the filling body lies almost against the inner surface of the horn antenna and at the lowest permissible temperature, the filling body has a maximum separation from the horn antenna. The separation is so dimensioned that still no negative effects arise as regards HF performance of the horn antenna and measurement characteristics.

In an especially preferred form of embodiment of the invention, it is provided that the defined separation leads to a gap between the inner surface of the horn antenna and the outer surface of the dielectric filling body of approximately 0.2-2 mm. A gap filled with air and having a gap width between 0.2-2 mm is advantageous, since this small gap width range has no influence on the HF-performance of the antenna.

In an advantageous form of embodiment of the solution of the invention, it is provided that the defined separation between the inner surface of the horn antenna and the outer surface of the dielectric filling body is constant. The gap between the inner surface of the horn antenna and the outer surface of the filling body is always formed with the same separation value, so that almost everywhere on the inner surface of the horn antenna the same reflection characteristics reign.

An effective embodiment of the apparatus of the invention provides that the defined separation is periodically or randomly interrupted, so that at least one ridge or, in general, at least a surface structure is formed on the outer surface of the filling body and/or on the inner surface of the horn antenna, with the structural components of the surface structure bordering one another or being spaced from one another. By the bordering or spaced formation of ridges or surface structures, e.g. honeycombs, circles, truncated cones and/or pyramids, on the outer surface of the filling body and/or the inner surface of the horn antenna, the mechanical stability of the filling body is increased in the horn antenna. Moreover, this enables a more accurate positioning of the filling body relative to the central axis of the horn antenna. The cavities between these ridges and surface structures are so calculated and formed, that the thermal expansion of the dielectric material of the filling body can occur almost unhindered.

In an embodiment of the apparatus of the invention, it is provided that the filling body lies against the horn antenna over a certain distance on the process side for support and compensation of the process pressure forces.

In an especially preferred form of embodiment of the invention, it is provided that, in the defined separation between the inner surface of the horn antenna and the outer surface of the dielectric filling body, an attenuating foil absorbing the high-frequency signal is provided. Due to the provision of an attenuating film in the defined separation between the inner surface of the horn antenna and the outer surface of the dielectric filling body, disturbing reflections of the high-frequency measuring signal in the near region, such as e.g. ringing due to multiple reflections with a part of the horn antenna filled with a filling body, are reduced. These disturbing reflections arise, however, not in the gap provided for the compensation of the thermal expansion of the filling body, but, instead, generally at the boundary surfaces of the filling body. The disturbing reflections are present also in the case of the filling bodies of the state of the art built in multiple parts of different materials, but are, however, in contrast to the plastics used in the invention, such as polytetrafluoroethylene (PTFE), suppressed by application of a strongly attenuating filling material, such as e.g. Eccolite and Rohacell.

An advantageous embodiment of the solution of the invention provides that at least one sealing element and/or at least one locking element are/is provided between the filling body and the horn antenna, for performing a sealing function and effecting a simultaneous locking of the filling body in the horn antenna.

A very advantageous variant of the solution of the invention is one wherein the sealing element and/or the locking element are/is embodied in the waveguide section between the horn antenna and the filling body. Best-possible sealing characteristics of the sealing element are achieved, when the sealing element is arranged in the waveguide section, which has the smallest surface to be sealed and experiences little of the reachable, high process temperature in the process space or, as a result, experiences little of the accompanying temperature change.

An especially advantageous, further development of the solution of the invention provides that a disk-shaped widening is formed on the end of the filling body facing the process space to serve as a process sealing element. By a flange plating, which is formed by a disk-shaped widening of the filling body in this region of the radiation aperture of the horn antenna, it is possible to avoid provision of an additional sealing element in this region. This flange plating made of the material of the filling body is clamped sealingly between the two edges of two flange nozzles by a radially located, screwed connection or via a Tri-Clamp closure mechanism.

According to a helpful embodiment of the apparatus of the invention, it is provided that the shape-transition of the filling body from the flared horn section to the disk-shaped widening is continuously rounded, in order to avoid a notch-effect in the filling body in the area of the shape-transition. The shape-transition from the horn section to the disk-shaped widening must not occur abruptly or as a corner, since, in the case of a thermal expansion of the filling body, large stresses can arise at this corner, so that there would be a great risk of crack initiation and growth, thus fatigue, of the material. Therefore, this corner running around the filling body is rounded, e.g. made semicircular or elliptical.

A suitable embodiment of the apparatus of the invention includes that the filling body and/or the horn antenna are/is embodied each as a plurality of parts and/or each formed of a plurality of different materials.

In an advantageous form of embodiment of the invention, it is provided that the filling body has in the radiation direction a convex, concave or conical shape or a Fresnel-lens form. By providing such microwave-concentrating elements on the end of the filling body facing the process space, phase differences, which can arise in the horn section of the horn antenna, are compensated, so that a desired radiation characteristic, e.g. a planar wave-front, of the measuring signal is radiated and received.

In view of the features as above explained, the invention provides the advantages and characteristics that a cost-favorable, temperature-stable and pressure-resistant, as well as medium-resistant, horn antenna with good HF-performance is produced for fill-level measuring devices.

Other advantages of the invention include that, by the forming of a gap between the metal horn antenna and the dielectric filling body, the different thermal expansions of the filling body and the horn antenna arising in the case of high use-temperatures are compensated and the significant mechanical stresses in the filling body associated therewith in the state of the art are avoided, so that also the effects on quality of seal and HF-performance due to the expansion of the filling body are improved. Moreover, significant constraints concerning choice of suitable materials occurring for this reason in the state of the art are eliminated. Especially, the invention makes possible the application of very temperature-stable and microwave-transmissive plastics, such as PTFE or PFA, which, however, have high coefficients of thermal expansion.

BRIEF DESCRIPTION OF THE DRAWINGS

The invention and selected examples of embodiments will now be explained in greater detail on the basis of the appended drawings. For simplification, identical parts in the drawings have been provided with equal reference characters. The figures of the drawings show as follows.

DETAILED DISCUSSION

Figure 1:
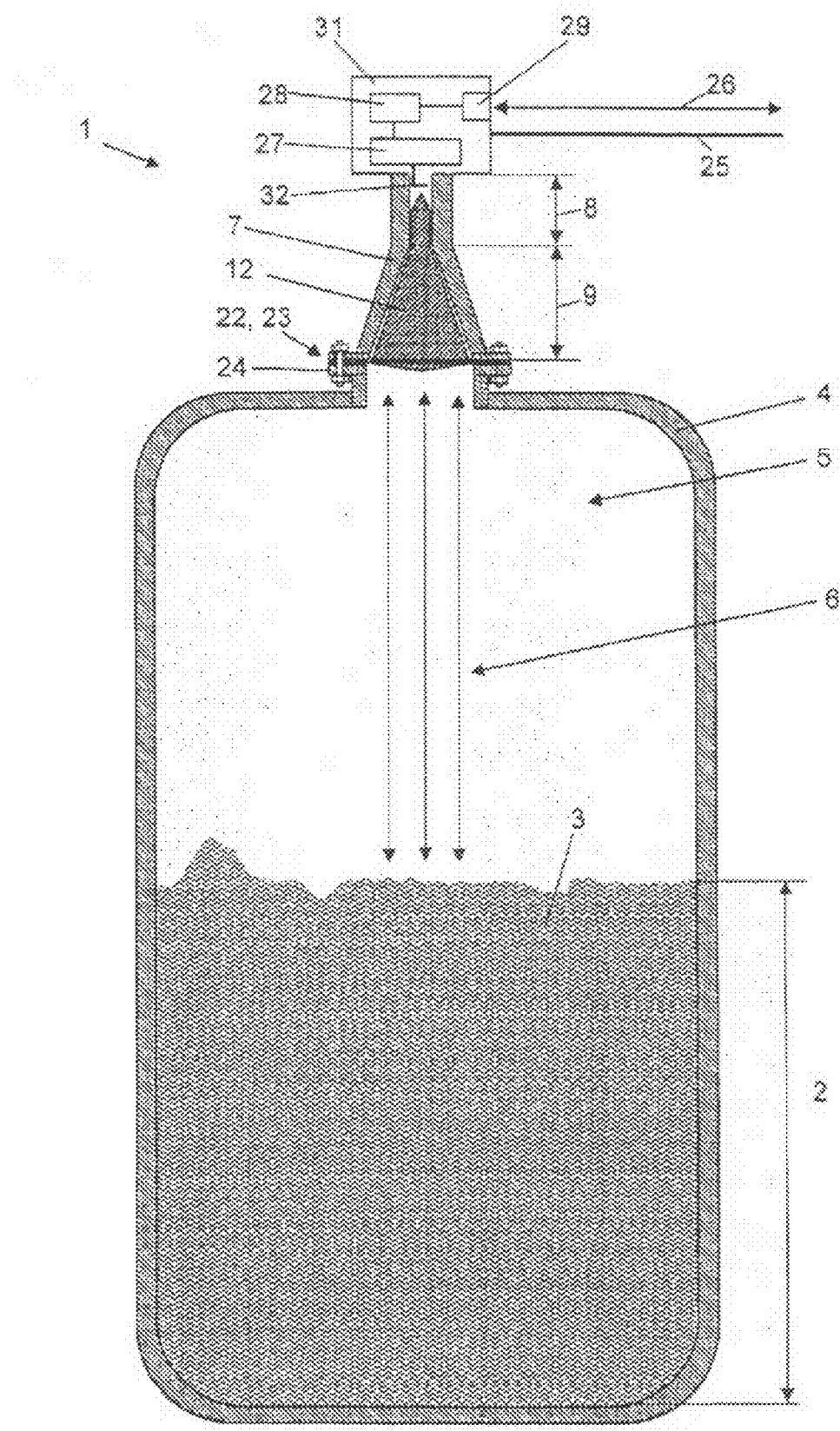
FIG. 1 a schematic, total illustration of an apparatus mounted on a container for ascertaining and monitoring fill level of a medium in a container by means of a horn antenna of the invention.

FIG. 1 shows an example of an application of the horn antenna 7 of the invention in a process measurement system. The apparatus 1, i.e. the measuring device in FIG. 1, as mounted via a flange 24 on a container 4, ascertains, for example according to the travel-time measuring method, the fill level 2 of a medium 3 in the form of a fill substance in the container 4. The horn antenna 7 of the invention can be considered as divided into two sections—the waveguide section 8 and the flared horn section 9.

The apparatus, measuring device, 1 includes a sending/receiving unit 27, in which the measuring signals 6 are produced and radiated by a coupling element 32 in the waveguide section 8 of the horn antenna 7. The measuring signals 6 coupled into the horn antenna 7 are radiated through the material of the filling body 12 and then from the horn antenna 7 into the measuring space 5 with a predetermined radiation characteristic. Most often, a radiation characteristic of the measuring signals 6 exhibiting a planar wave front is sought. The measuring signals transmitted into the measuring space 5 are reflected on various surfaces of the container 4 or on a surface of the medium 3 and received back by the sending/receiving unit 27 after a certain travel time. By way of the travel time of the measuring signals 6, the fill level 2 of the medium 3 in the container 4 is determined.

The control/evaluation unit 28 has the task of evaluating the received, reflected echoes of the measuring signals 6 by further processing the measuring signal 6 by a signal processing and special signal evaluation algorithms to determine travel time and fill level 2.

Via the supply line 25, the measuring device 1 is supplied with necessary energy, or power. The control/evaluation unit 28 communicates via a bus coupler 29 and the fieldbus 25 with a remote supervisory location and/or with further measuring devices 1, which are not explicitly shown. An additional supply line 25 for energy, or power, supply of the measuring device 1 is omitted when the measuring device 1 is a so-called two-conductor measuring device, whose communication and energy supply takes place via the fieldbus 26 exclusively and simultaneously via a two-wire line. The data transmission, or communication, via fieldbus 26 is accomplished, for example, according to the CAN-, HART-, PROFIBUS DP-, PROFIBUS FMS-, PROFIBUS PA-, or FOUNDATION FIELDBUS-standard.

Figure 2:
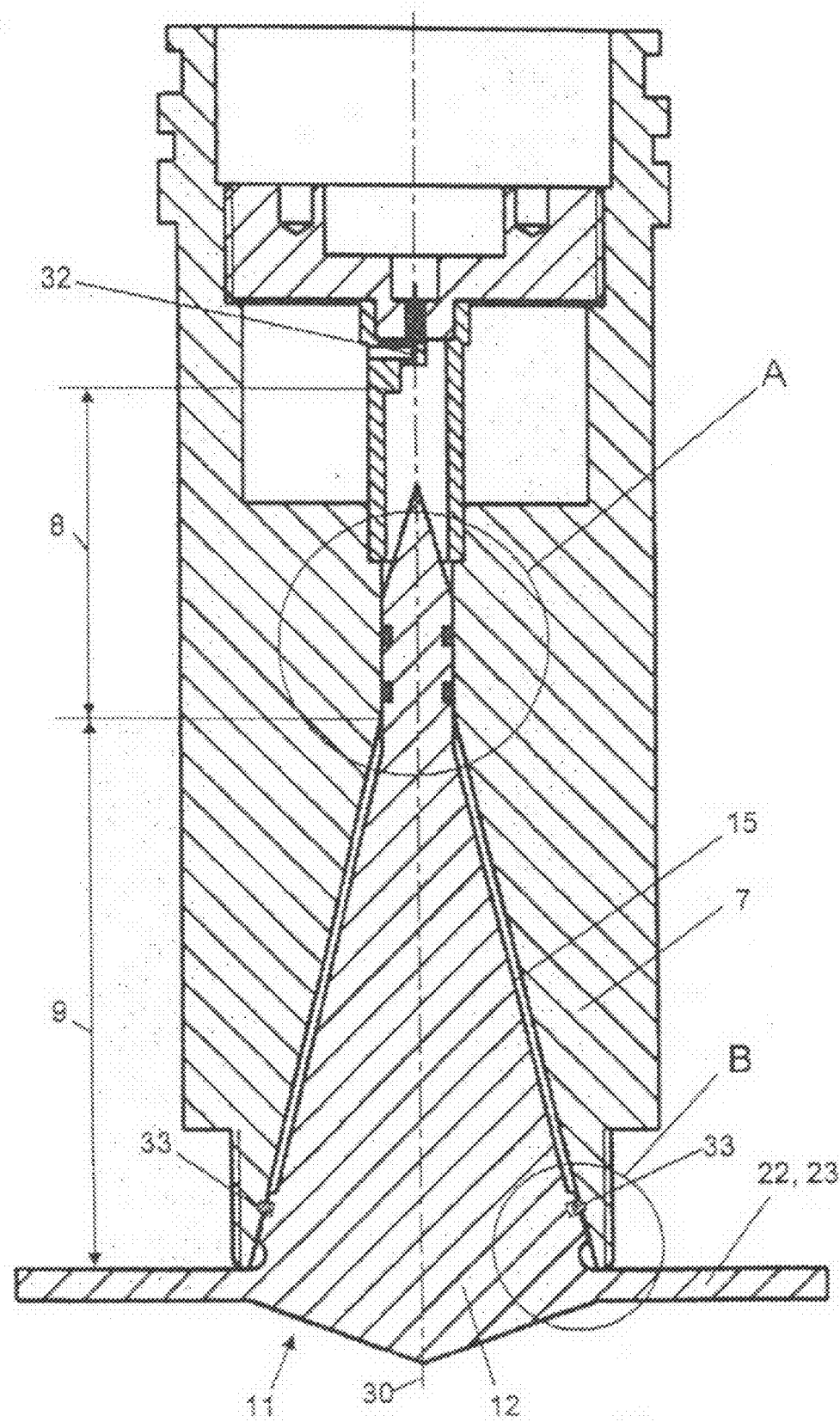
FIG. 2 a schematic illustration of a first example of an embodiment of the horn antenna of the invention.

FIG. 2 shows the horn antenna 7, or horn-shaped antenna, of the invention. The antenna is made of an electrically conductive material and filled internally, at least partially, with a filling body 12 of a dielectric material. Horn antenna is made, for example, of a metal, such as stainless steel, or a conductive plastic, and the filling body especially of polytetrafluoroethylene (PTFE) or perfluoroalkoxy-copolymer (PFA). The plastics, polytetrafluoroethylene or perfluoroalkoxy-copolymer, have good chemical and physical, material properties, such as predestine them for this application. E.g., they are resistant to almost all chemicals, have very high temperature resistance, good microwave transmissivity, and good HF-performance. Advantageously, the dielectric filling body 12 is, for reasons of cost and manufacture, made of one piece; however other embodiments of the filling body 12 can be multi-piece and/or of different materials. Manufacture of the filling body 12 is most often accomplished by turning, injection molding or isostatic pressing of the dielectric material, or plastic.

In order to assure a low-reflection, wave-resistance-matched transition between filling body 12 and the following measuring space 5, the end of the filling body 12 facing the measuring space 5 is provided in the form of a obtuse cone. In this way, phase differences between individual wave regions, such as arise during travel through the horn geometry, are equalized, and a planar wave is emitted. Depending on the desired radiation characteristic, however, also plane, convex or concave transition geometries can be used.

The measuring signal 6 is, as described with respect to FIG. 1, injected via a coupling element 32 in the waveguide section 8. Waveguide section 8 is formed as a hollow conductor, e.g. a round or rectangular, hollow conductor. Preferably, the hollow conductor, waveguide section 8, is embodied such that a TE-wave mode is formed. In the waveguide section 8, the filling body 12 is embodied especially as a matching element, e.g. conically tipped or stepped pyramid, in order to assure a good matching of the hollow conductor filled with air to the hollow conductor filled with dielectric material. By the matching in the waveguide section 8 of the horn antenna 7, it is avoided that, already in this waveguide section 8, the injected measuring signal 6 is partially reflected back, and, consequently, attenuated. Waveguide section 8 of the horn antenna 7 can also be completely filled by the dielectric material of the filling body 12.

Filling body 12 is, as described above, made of a dielectric plastic, e.g. PTFE or PFA, which, as a rule, has, in comparison with the surrounding material, e.g. stainless steel, of the horn antenna 7, a markedly higher coefficient of thermal expansion. Therefore, provided at least partially between the inner surface 10 of the horn antenna 7 and the outer surface 13 of the filling body 12 is a defined separation 15. In this way, a gap 14 is formed, which has, for example, a gap width of, typically, 0.2-2 mm. Due to the small gap width, the measuring signal 6 is practically not affected, so that negative effects on the measuring performance of the total apparatus 1 do not occur. If a gap width of greater than 2 mm is chosen, such can, however, negatively affect the measuring performance of the apparatus 1, since standing waves of the measuring signal 6 then form in the gap 14. By a conductive coating of the outer surface 13 of the filling body 12 in the horn section 9 and, on occasion, in the waveguide section 8 with a sufficient electrical contact to the conductive horn antenna 7, also a gap width of more than 2 mm has then almost no longer any effects on the measuring properties of the horn antenna 7. The embodiment of the filling body 12 with a conductive coating is not shown explicitly in FIGS. 2 and 3. Furthermore, another option is to provide an attenuating foil or film 34 for preventing disturbing reflections on the bounding surfaces of the filling body 12 and thus to prevent negative effects on the measuring performance. To this end, an attenuating foil 34, e.g. one made of a plastic matrix filled with ferrite or carbon, is provided following the periphery of the filling body 12 in the region of the gap 14 and equipped, at least partly, with an adhesive film for affixation to the inner surface 10 of the horn antenna 7 and/or to the outer surface 13 of the dielectric filling body 12. An alternative method of securement provides complementarily formed, mutually engaging, fastener elements at the joints of the microwave-absorbing, attenuation foil 34. The fastener elements are so formed, that the joints of the attenuating foil 34 are releasably connectable together. These mutually engaging joints are connected together in the region of the gap 14, so that the microwave absorbing attenuating foil 34 hugs the filling body 12 or lies closely against the corresponding horn section 9 of the horn antenna 7. By this embodiment of the fastening of the joints of the attenuating foil 34, a simple assembling of such into the gap 14 is made possible. For simplification of manufacture and assembly, another opportunity is to integrate the attenuating foil 34 directly into an injection molded variant of the filling body 12 in the injection molding process by laying an appropriately formed, attenuating foil 34 into the injection mold, or the foil is formed by injection simultaneously or with time sequencing.

Figure 3:
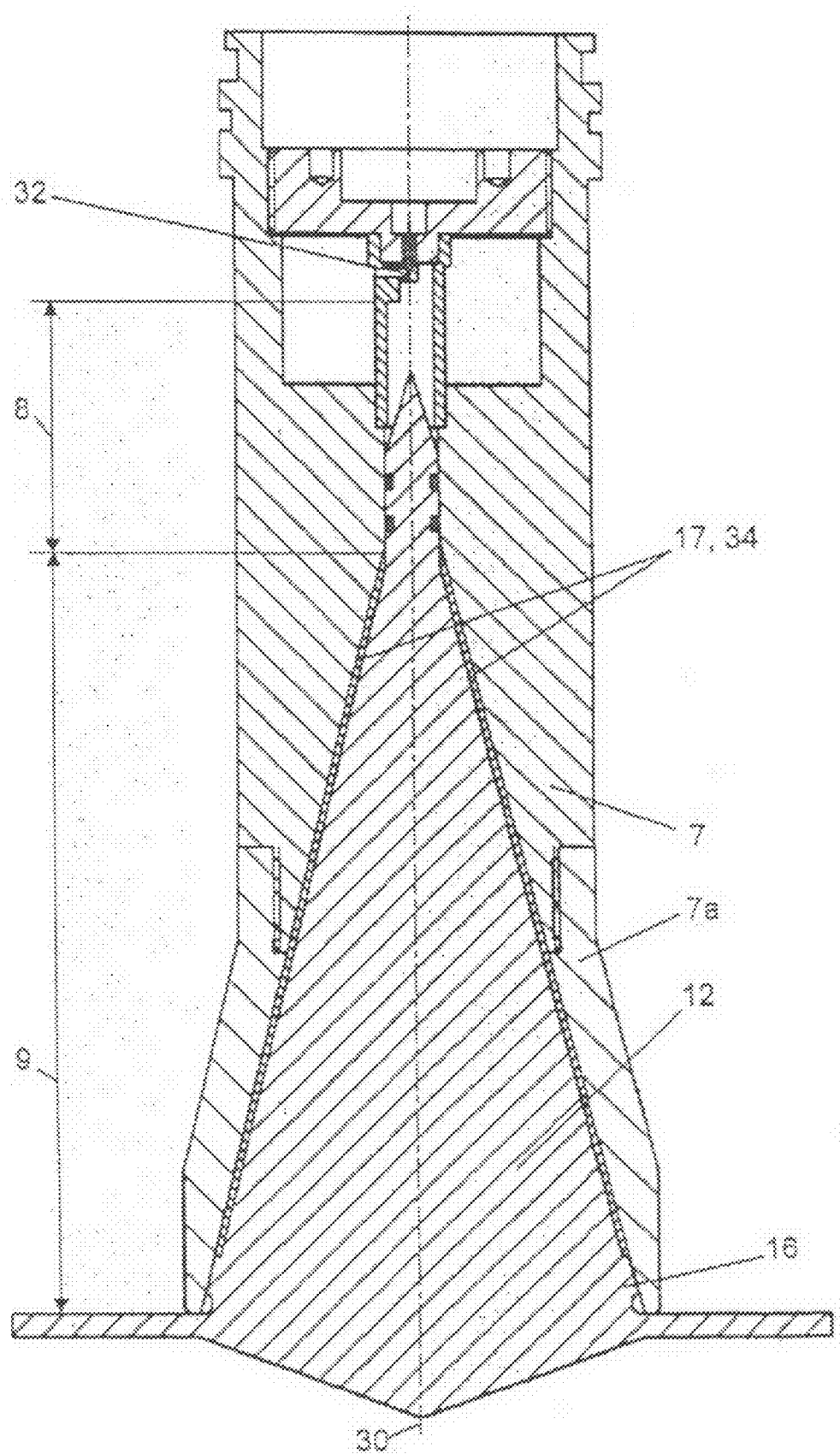
FIG. 3 a schematic illustration of a second example of an embodiment of the horn antenna of the invention.

Gap 14 can be formed such that it is constant, as shown in FIG. 2, or it can be interrupted according to a surface structure 17, or ridges 15, on the inner surface 10 of the horn antenna 7 and/or on the outer surface 13 of the filling body 12 in the flared horn section 9. This, for example, periodic interruption can be provided in the form of intermediate ridges, or a corrugated profile, in the outer surface 13 of the filling body 12, so that the inner surface 10 of the horn antenna 7 lies partially against the outer surface 13 of the filling body 12 in the horn antenna 9, and vice versa, as shown in FIG. 3.

If the ridges 16 or the surface structure 17 are/is provided in the inner surface 10 of the horn antenna 7 or in the conductive coating of the filling body 12, then one speaks in the technical literature of a corrugated horn antenna. In the case of this type of horn antenna 7, the ridges 16 or the surface structure 17 are/is accordingly embodied, such that a certain phase shift is imposed on the measuring signal 6. This phase shift is so calculated and designed such that a predestined radiation characteristic of the horn antenna 7 is produced, e.g. a planar wave front. The ridges 16 or the surface structure 17 can be produced in simple manner in the inner surface 10 of the horn antenna 7 in the manufacture of the waveguide section 8 and the flared horn section 9 by cutting such out on a lathe.

An other opportunity is to provide in the gap 14 a corresponding structural element, e.g. a honey-comb structure or separate ring structure of a material deviating, on occasion, from that of the filling body 12, with the structural element filling the gap, at least partially, and positioning the filling body 12, such that it is centered on the central axis 30 of the horn antenna 7. Also three-dimensional, structural elements, e.g. spring structures in honey-comb format, can be introduced into the gap 14, such that these spring elements position the filling body 12 in the horn antenna 7 symmetrically to the central axis 30 and, in the case of a coating of the filling body 12 with a conductive layer, contact such electrically.

The gap 14 can also be completely filled by a material, when its coefficient of thermal expansion has an opposite sign and a pre-calculated, compensating value relative to the coefficient of thermal expansion of the material of the filling body 12. Additionally, compressible, foam plastics or compressible, viscous gels and liquids can be integrated into the gap 14.

Another opportunity is e.g. the targeted introduction of microwave attenuating materials, for preventing possibly occurring, disturbing, multiple reflections in the horn antenna.

Figure 5:
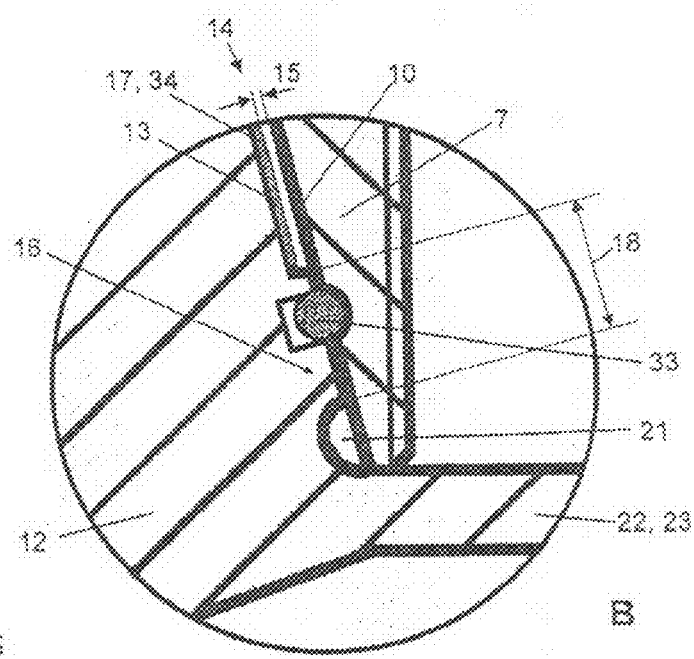
FIG. 5 an enlarged detail B of FIG. 2 of the first example of an embodiment of the horn antenna of the invention.

In the detail B of FIG. 2, as shown enlarged in FIG. 5, it is illustrated that the outer surface 13 of the filling body 12 lies directly against the inner surface 10 of the horn antenna 7 over a certain length 18 for pressure-resistance purposes, with, preferably, a 5-30 mm wide, encircling ridge 16 being formed for stabilizing the position of the filling body 12 relative to the central axis 30.

Figure 4:
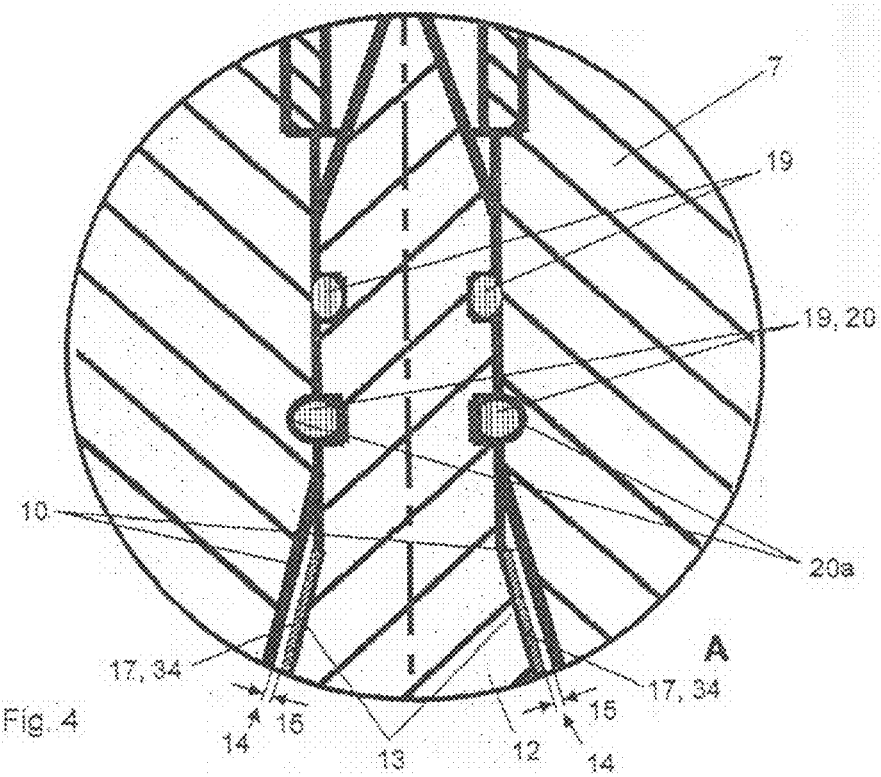
FIG. 4 an enlarged detail A of FIG. 2 of the first example of an embodiment of the horn antenna of the invention.

In the detail A of FIG. 2, as shown enlarged in FIG. 4, it is illustrated that the filling body 12 has, in the waveguide section 8, one or more sealing elements 19, which also serve as a locking element 20 of the filling body 12 in the horn antenna 7. An advantage of this positioning of the sealing elements 19, or the sealing geometry, lies in the fact that, by the spatial separation from the process space 5, the temperature loading of the sealing elements 19 is markedly reduced and, therewith, their service life considerably lengthened.

The sealing elements can, however, also, as shown in WO 03/078936, be arranged at the end facing the process space, between the filling body 12 and the horn antenna 7, or therebetween in the flared horn section 9. Preferably, however, the position of the smallest diameter of the filling body 12 in the waveguide section 8 is selected, since, here, due to the smaller sealing areas and lower temperatures, the chances of leaks are lowest.

As already described above, one or more sealing elements 19 can also be so embodied as locking elements 20, for fixing the filling body 12 in its position in the horn antenna 7 and thus preventing a falling of the filling body 12 out of the horn antenna 7. This locking of the filling body is achieved by providing in the waveguide section 8 in the position of the locking element 20 on the inner surface 10 of the horn antenna 7 a recess 20*a*, e.g. a circumferential groove with a semicircular cross section, in which the sealing element 19, or locking element 20, engages. In this way, a commercially available O-ring of appropriate size can be applied as sealing element 19, or locking element 20.

An alternative or supplemental locking element 20 is the provision of a resilient retaining element 33, such as a round wire, a flat wire, a Seeger ring, for retaining the filling body 12, e.g. of the material, polytetrafluoroethylene (PTFE), against falling out of the horn section 9 of the horn antenna 7. As the detail B of FIG. 1 shows in FIG. 5, the retaining element 33 is, for example, so formed as a resilient retaining ring of spring steel that no disturbing reflections are produced by this retaining element 33 in the high-frequency measuring signal 6.

For avoiding a notch effect in the presence of compressive loading, the shape transition 21 from the horn section 9 to the disk-shaped widening 22 is typically rounded. The disk-shaped widening 22 of the filling body 12 thus forms a flange plating 23 between the device flange and the process flange 24, as a primary process sealing element 23. By disk-shaped widening 22 of the end of the filling body 12 facing the measuring space 5, one obtains an additional process sealing element 23, or a further sealing geometry. The thickness of the flange plating disk 23 amounts, preferably, to 2-10 mm.

The sealing element 19 and the locking element 20 are, as already described above, implemented in the waveguide section 8 of the filling body 12, especially by two O-rings. These sealing elements are for the purpose of preventing medium 3 that has gotten into the gap 14, from reaching into the region of the coupling element 32 and/or the measuring electronics 31. Thus, medium 3 can possibly migrate into gap 14 due to permeation, or diffusion, i.e. due to material transport in solid material on a molecular plane, especially such in the material of the process sealing element, or flange plating 23.

The measuring signal 6, or the microwave signal, can, following leaving the dielectric filling body 12, either be radiated freely in the direction of the medium 3, or still be guided over some distance, through a cylindrical or slightly flaring, hollow conductor, thus through a so-called stilling well.

FIG. 3 shows a horn antenna 7, in which a smaller version of the horn antenna 7 is extended by means of an extension element, or horn extension, 7*a* to form a larger version, whereby the horn antenna 7 acquires a larger antenna aperture. The extension element, or horn extension, 7*a* is, for such purpose, connected with the smaller version of the horn antenna 7 with a securement element, e.g. a screw connection.

The filling body 12 is embodied as one piece of dielectric material; however, also a multi-piece, adaptive form of embodiment of the filling body 12 is possible. By this modular construction of the body of the horn antenna 7, manufacturing and material costs can be saved, since the smaller version of the horn antenna 7 can be manufactured in large numbers and only the extension element 7a and a possibly larger filling body 12 need to be specially manufactured.

The gap 14 between the outer surface 13 of the filling body 12 and the inner surface 10 of the horn antenna 7 is filled out by a surface structure 17 or ridges 16 in such a manner that cavities still exist therebetween for the thermal expansion of the filling body 12. Provision of the surface structures 17 or ridges 16 in the gap 14 improves the ability of the filling body 12 to withstand process pressure in the process space 5.

The invention claimed is:

1. An apparatus for ascertaining and monitoring the fill level of a medium in a container by means of a travel-time measuring method of high-frequency measuring signals, comprising:
    a horn antenna having a waveguide section, a flared, horn section, and a cavity filled, at least partially, with a dielectric filling body, wherein a defined separation is provided in said flared, horn section between the inner surface of said horn antenna and the outer surface of said dielectric filling body for compensating different thermal expansions of said dielectric filling body and said horn antenna, and
    at least one sealing element or oat least one locking element between said filling body and said horn antenna is provided for performing a sealing function and, simultaneously, a locking of said filling body in said horn antenna, wherein:
    an outer surface of said filing body lies directly against the inner surface of said horn antenna over a certain length for pressure-resistance purposes, with an encircling ridge being formed for stabilizing the position of said filling body relative to the central axis; and
said sealing element or said locking element is placed in said waveguide section between said horn antenna and said filling body.

2. The apparatus as claimed in claim 1, wherein:
by said defined separation, a gap of 0.2-2 mm is formed between the inner surface of said horn antenna and the outer surface of said dielectric filling body.

3. The apparatus as claimed in claim 1, wherein:
said defined separation between the inner surface of said horn antenna and the outer surface of said dielectric filling body is constant.

4. The apparatus as claimed in claim 1, wherein:
said defined separation is interrupted periodically, or arbitrarily, so that the at least one ridge or at least one surface structure is formed on the outer surface of said filling body and/or on the inner surface of said horn antenna adjoining one another or separated from one another.

5. The apparatus as claimed in claim 1, further comprising:
an attenuating foil absorbing the high-frequency measuring signal in said defined separation between the inner surface of the horn antenna and the outer surface of said dielectric filling body.

6. The apparatus as claimed in claim 5, wherein:
a shape transition of said filling body from said flared horn section to said disk-shaped widening as a flange plate is continuously rounded, for preventing a notch effect in said filling body in the region of said shape transition.

7. The apparatus as claimed in claim 1, wherein:
a disk-shaped widening as a flange plate is formed on the end of said filling body facing the process space.

8. The apparatus as claimed in claim 1, wherein:
said filling body or said horn antenna is multi-piece or it is formed of a plurality of different materials.

9. The apparatus as claimed in claim 1, wherein:
said filling body has in the radiation direction one of: a convex, concave, conical or Fresnel lens shape.

* * * * *